United States Patent [15] 3,677,391
Schaeffer [45] July 18, 1972

[54] APPARATUS AND METHOD FOR SHINGLING ARTICLES OF UNIFORM NON-PLANAR SHAPE

[72] Inventor: Richard A. Schaeffer, Wyoming, Ohio
[73] Assignee: The Procter & Gamble Company, Cincinnati, Ohio
[22] Filed: Oct. 26, 1970
[21] Appl. No.: 83,998

[52] U.S. Cl.................................................198/35, 198/76
[51] Int. Cl.....................................B65g 57/00, B65g 37/00
[58] Field of Search.....................198/76, 35, 34; 271/79, 69, 271/75

[56] References Cited

UNITED STATES PATENTS 2,392,746 1/1946 Labombarde............................271/69
3,570,686 3/1971 Moll.........................................198/76

Primary Examiner—Richard E. Aegerter
Attorney—Fredrick H. Braun and John V. Gorman

[57] ABSTRACT

An apparatus and method for handling an advancing column of individual articles of uniform non-planar shape such that the articles which are initially moving in spaced-apart fashion are transformed into a horizontally compact "shingled" relationship. The articles are initially moved in spaced relationship on a first conveyor surface. A second conveyor surface is provided which moves at a slower speed and which is mounted in a slightly higher plane just beyond the end of the first conveyor in position to receive the articles therefrom. The articles are continuously moved into a contacting relationship against the stop formed by the second conveyor at the terminus of the first conveyor to transform the spaced articles into an inventory of shingled articles on the first conveyor whereupon they are individually transferred to said second conveyor upon which the articles form a continuously shingled array.

10 Claims, 2 Drawing Figures

Patented July 18, 1972

3,677,391

INVENTOR.
Richard A. Schaeffer
BY
Fredrick H. Braun
ATTORNEY

APPARATUS AND METHOD FOR SHINGLING ARTICLES OF UNIFORM NON-PLANAR SHAPE

BACKGROUND OF THE INVENTION

The present invention is particularly adapted for shingling relatively thin articles of uniform non-planar shape. As used herein, the term shingle or shingling will be understood to mean the formation of a uniform symmetrical group of contiguous articles into a compact column of articles by causing them to stack up in a horizontal plane with their major surfaces interengaged.

In particular, the invention has been preferably developed for the handling of non-planar articles such as uniform potato chips of the type generally described in U.S. Pat. No. 3,498,798—Baur et al. entitled PACKAGING OF CHIP-TYPE SNACK FOOD PRODUCTS which issued on Mar. 3, 1970. In a preferred form, the potato chips are relatively thin and of uniform size and shape which makes it possible to stack them in complete interfitting relationship by virtue of the fact that the chips have uniformly curved surfaces in each of two orthogonal planes.

It will be understood, however, that the nature of the product being shingled and its precise configuration is not material to a comprehension of the invention nor is it to be considered a limitation thereon. That is, the invention can be used effectively with any kind of uniform non-planar relatively thin article regardless of its precise shape and composition. Purely for convenience of description, the product being shingled may be referred to as a potato chip herein since the invention has been successfully practiced with such a product.

The present invention is particularly adapted for receiving potato chips in single file spaced relationship such as delivered upon completion of the frying cycle by a machine of the kind described in U.S. Pat. No. 3,520,248—MacKendrick which issued on July 14, 1970 and is entitled CHIP FRYING MACHINE. Potato chips are continuously delivered in single file order and deposited on a suitable takeaway conveyor by means of a plurality of potato chip delivery or picker members which are designed to deliver the chips in that fashion from the MacKendrick machine.

In order to permit high speed filling of packages of the type disclosed in the above cited Baur et al patent, it is necessary to shingle the chips initially whereupon they can be metered and packaged at high speeds by means of an apparatus as disclosed and claimed in U.S. Pat. No. 3,609,939 issued on Oct. 5, 1971 to Leonard C. Hooper et al., which is entitled APPARATUS FOR THE METERING AND LOADING OF ARTICLES OF SUBSTANTIALLY UNIFORM SIZE AND SHAPE.

Thus the present invention fulfills the need for an apparatus and method for receiving newly fried potato chips received at high rates from the apparatus of MacKendrick and shingling the chips prior to metering and packaging the chips with an apparatus such as that disclosed and claimed in the Hooper et al. application. The need for an effective and reliable method and apparatus of this nature became apparent at the time when the Hooper et al. apparatus was placed in operation.

It is to be noted that each of the above cited patents and application are commonly owned by the assignee of the present application.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of a reliable apparatus and method for shingling articles of uniform non-planar shape continuously in order to transform an advancing column of articles from an initial individually spaced apart relationship into a shingled relationship for the purpose of allowing additional handling and packaging steps to be carried out conveniently and effectively.

Another object of the invention is the provision of an apparatus and method of the aforesaid character in which shingling of the articles is initiated by initially arresting the speed of the article in a controlled manner on a high speed conveying surface prior to the transfer of the articles to a slower speed conveying surface.

Still another object of the invention is the provision of a method and apparatus for the shingling of articles in which an inventory of shingled articles is formed at the terminus of a high speed conveying surface or belt whereupon the shingled articles are moved "uphill" by virtue of the fact that a slower speed conveying surface or belt carrying a continuous shingled array of articles has its surface mounted in a plane higher than that of the terminus of the high speed belt where the shingled inventory is maintained.

A further object of the invention is the provision of an apparatus and method for shingling articles of uniform non-planar shape which is highly reliable in its mode of operation such that it provides easy and ready control of the articles during the shingling thereof as well as the low speed transfer of the shingles articles from a higher to a lower speed conveying surface wherein the latter is supported in a higher plane.

These and other objects are achieved by the provision of first conveyor means having a conveying surface for receiving articles deposited thereon in spaced relationship. A second conveyor moving at a lesser speed than the first conveyor is aligned with the first conveyor but has its conveying surface and inlet end mounted in a slightly higher plane than the outlet end of said first conveyor. The articles deposited in spaced relationship on the first conveyor advance as a column to the outlet thereof where they are transformed into a shingled relationship as they contact the stop formed by the inlet end of the slower moving second conveyor surface. An inventory of shingled articles is thus formed at the outlet of the first conveyor whereupon the articles are continuously moved to an array of shingled articles on the second conveyor as successive articles are moved into the shingled inventory on the first conveyor.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing in which:

DESCRIPTION OF THE PREFERRED EMBODIMENT

Figure 1:
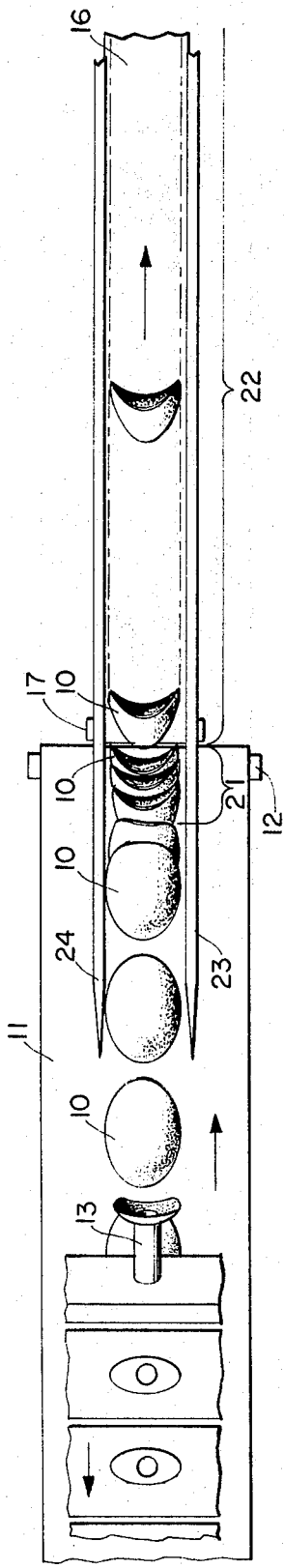
FIG. 1 is a fragmentary plan view of the apparatus of the invention illustrating the method by which the shingling of potato chips is carried out.

The preferred embodiment of the invention is particularly adapted for receiving individual potato chips 10 of thin and uniform configuration. The chips 10 are preferably formed such that their surfaces are similarly and uniformly curved in each of two orthogonal planes as previously stated. The invention, while being described in terms of handling potato chips 10, will be understood to be much broader in scope as it is capable of handling articles of uniform configuration that are suitable for shingling regardless of their exact shape or composition.

The chips 10 are deposited in relatively uniform spaced relationship on a first conveying means which comprises a conveying surface or belt 11 supported by the pulley 12 at one end and driven at a reasonably uniform high speed by conventional means. The chips 10 are deposited upon the conveying belt 11 by the picker members 13 to which they are initially vacuum held as illustrated at 14 whereupon they are released and deposited as illustrated at 15. The latter step may, if desired, be carried out with the use of positive air pressure. The picker members 13 are a preferred device for removing and depositing chips after frying as by the use of a frying machine of the type described in the previously cited MacKendrick patent.

A second conveyor means is provided in the form of a conveying surface or belt 16 supported at one end by the pulley 17 and moved at relatively slow speed by conventional means. Preferably, the second conveyor means comprising the conveying belt 16 is aligned with said first conveying means comprising the conveying belt 11.

Figure 2:
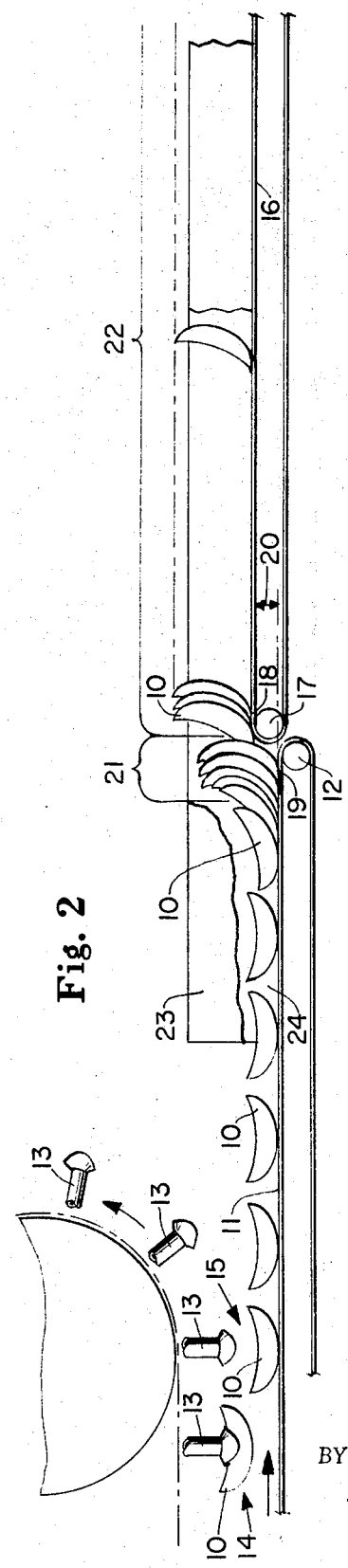
FIG. 2 is a fragmentary elevation similar to FIG. 1 which provides another view of the practice of the method and apparatus of the invention.

It will be apparent from an examination of FIG. 2 of the drawings that the conveying belt 16 of the second conveyor means is mounted in a higher plane than the conveying belt 11 of the first conveyor means. While in the drawing the conveying belts 11 and 16 are illustrated as being parallel in a vertical plane, it will be understood that this is not an absolute necessity for the proper functioning of the invention although it is critical that the inlet end 18 of the conveying belt 16 in the area around and upstream of the pulley 17 be at a slightly higher elevation than the outlet end 19 of the conveying belt 11 in the area immediately preceding the travel of the conveying belt 11 around the pulley 12. This difference in elevation denoted by the reference number 20 will be referred to as the shingle step. The shingle step 20 permits the portion of the conveying belt 16 travelling over the pulley 17 to act as a stop with respect to the chips 10 moving forward on the conveying belt 11.

As previously indicated, the conveying belt 11 moves at a higher surface speed than the surface speed of the conveying surface or belt 16. As an example, in the shingling of potato chips having a length dimension of about 2½ inches and spaced on 4 inch centers, it has been found that good results are obtained when the speed of the conveying belt 11 is about 200 feet per minute and the conveying belt 16 about 10 feet per minute using a shingle step of about one-fourth inch. It will be apparent that these dimensions and speeds can be modified by those skilled in the art without deviating from the concept of the claimed invention.

Referring once again to FIG. 2 of the drawing, it will be noted, as previously stated, that the chips 10 are deposited on the conveying surface or belt 11 by any suitable means such as the pickers 13 which deposit the chips in spaced relationship. The chips are advanced as a single file column of individual spaced articles by said conveying belt 11 until such time as the leading chip contacts the shingle step or stop 20 formed by the difference in elevation between the inlet end 18 of the second conveying belt 16 and the outlet end 19 of the first conveying belt 11.

The slower speed of the conveying belt 16 causes the leading chip to stand up in the manner shown in FIG. 2 whereupon the chip 10 slides on the conveying belt 11 to produce a force in its direction of movement which tends to hold the chip 10 in its upstanding position. On the other hand, the speed of movement of the conveying belt 16 is such that the chip 10 tends to hold momentarily at the stop in the area of the shingle step 20 until a plurality of successive chips 10 move into a shingled relationship and form a small inventory 21 of shingled chips 10 as illustrated in the drawing. The shingled inventory 21 is, in effect, formed at the junction of the conveying surfaces or belts 11 and 16.

A force relationship is set up between the shingled inventory 21 as well as the individual chips 10 which comprise the inventory 21 such that when the shingled inventory 21 reaches a predetermined length the forward chip 10 in the inventory will be moved upwardly for support by the conveying surface or belt 16 as a portion of the continuous array 22 of shingled chips supported by the conveying surface 16. The force relationship between the conveying surfaces or belts 11 and 16 is created by the belt speed, friction coefficients as well as the magnitude of the shingle step and the characteristics of the chips 10 themselves.

Guides 23 and 24 are preferably provided on either side of the inventory 21 and array 22. Preferably, as illustrated, the guides 23 and 24 extend upstream from the area of the shingle inventory. The purpose of the guides 23 and 24 is to maintain the chips in alignment as they move into shingled relationship.

With the above arrangement of elements, it will become apparent that the shingling of articles or chips 10 is initiated at the outlet end of a first high speed conveying surface or belt 11 whereupon the individual chips are transferred "uphill" to a second slower speed conveying surface or belt 16 where the array of shingled chips then moves forward for further processing and handling.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for shingling articles of uniform non-planar shape comprising:
  a. a first conveyor means having an outlet end and including a conveying belt for continuously advancing a column of said articles in spaced relationship, said conveying belt running over a pulley at said outlet end,
  b. a second conveyor means having an inlet end and including a conveying belt, said second conveyor means aligned with said first conveyor means, said second conveyor means having its inlet end and conveying belt mounted in a higher plane than the outlet end of said first conveyor means, said conveying belt of said second conveyor means running over a pulley at said inlet end, said last mentioned pulley being spaced above and slightly overlapping said pulley supporting said first conveying belt, a stop formed by the portion of the conveying belt of the second conveyor means in the area where it travels over said pulley at the inlet end thereof,
  c. said conveying belt of said first conveyor means moving at a higher linear speed than said conveying belt of said second conveyor means thereby transforming the spaced relationship of the articles into an inventory of shingled articles at the outlet end of said first conveyor means as the articles encounter said stop while moving forward on said first conveyor means prior to the transfer of said articles to said second conveyor means as an array in shingled relationship.

2. Apparatus for shingling articles of uniform non-planar shape as claimed in claim 1 wherein said conveying surface of said first conveyor means is mounted in parallel with the conveying surface of said second conveyor means.

3. Apparatus for shingling articles of uniform non-planar shape as claimed in claim 1 wherein each of said first and second conveyor means include oppositely disposed guides mounted thereover in spaced relationship and extending upstream and downstream from the stop to maintain the article in alignment as they move into a shingled relationship and after transfer to the second conveyor means.

4. Apparatus for shingling articles of uniform non-planar shape as claimed in claim 2 wherein each of said first and second conveyor means include oppositely disposed guides mounted thereover in spaced relationship and extending upstream and downstream from the stop to maintain the articles in alignment as they move into a shingled relationship and after transfer to the second conveyor means.

5. A method for shingling articles of uniform non-planar shape comprising the steps of:
  a. advancing a column of said articles in spaced relationship on a conveying surface,
  b. transforming the spaced relationship of said articles into a shingled relationship by continuously decelerating said articles and standing them up as they move against a stop thereby forming an inventory of articles in shingled relationship, c. thereafter successively elevating each of said articles and moving them forward as an array of shingled articles, and moving said array at a lower speed with respect to the original speed of movement of the articles advancing as a column in spaced relationship.

6. A method for shingling articles of uniform non-planar shape as claimed in claim 5 wherein the successive steps are performed substantially in a straight line.

7. Apparatus for shingling articles of uniform non-planar shape comprising:
   a. a first conveyor means having an outlet end and including a conveying belt for continuously advancing a column of said articles in spaced relationship, said conveying belt running over a pulley at said outlet end,
   b. a second conveyor means having an inlet end and including a conveying belt, said second conveyor means aligned with said first conveyor means, said second conveyor means having its inlet end and conveying belt mounted in a higher plane that the outlet end of said first conveyor means, said conveying belt of said second conveyor means running over a pulley at said inlet end, said last mentioned pulley being spaced above said pulley supporting said first conveying belt, a stop formed by a portion of the conveying belt of the second conveyor means as it travels over said pulley at the inlet end thereof,
   c. said conveying belt of said first conveyor means moving at a higher linear speed than said conveying belt of said second conveyor means thereby transforming the spaced relationship of the articles into an inventory of shingled articles at the outlet end of said first conveyor means as the articles encounter said stop while moving forward on said first conveyor means prior to the transfer of said articles to said second conveyor means as an array in shingled relationship.

8. Apparatus for shingling articles of uniform non-planar shape as claimed in claim 7 wherein said conveying surface of said first conveyor means is mounted in parallel with the conveying surface of said second conveyor means.

9. Apparatus for shingling articles of uniform non-planar shape as claimed in claim 7 wherein each of said first and second conveyor means include oppositely disposed guides mounted thereover in spaced relationship and extending upstream and downstream from the stop to maintain the articles in alignment as they move into a shingled relationship and after transfer to the second conveyor means.

10. Apparatus for shingling articles of uniform non-planar shape as claimed in claim 8 wherein each of said first and second conveyor means include oppositely disposed guides mounted thereover in spaced relationship and extending upstream and downstream from the stop to maintain the articles in alignment as they move into a shingled relationship and after transfer to the second conveyor means.

* * * * *